Feb. 9, 1954  J. W. GABEL  2,668,469
MOUNTING MEANS FOR MULTICOMPONENT OPTICAL ASSEMBLIES
Filed April 7, 1952
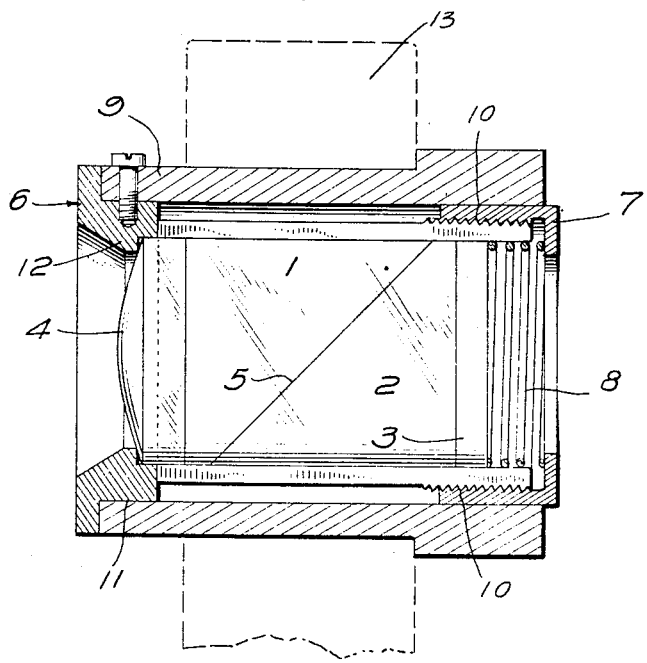
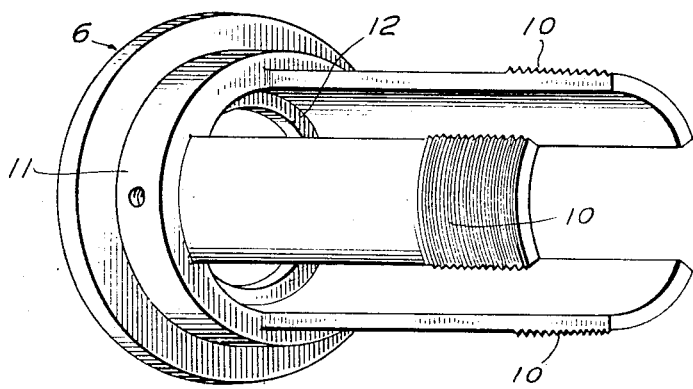
INVENTOR
JOSEPH W. GABEL,
BY
ATTORNEY Patented Feb. 9, 1954

2,668,469

UNITED STATES PATENT OFFICE 2,668,469

MOUNTING MEANS FOR MULTICOMPONENT OPTICAL ASSEMBLIES

Joseph W. Gabel, Sugar Grove, Ohio, assignor to American Cyanamid Company, New York, N. Y., a corporation of Maine Application April 7, 1952, Serial No. 280,882

5 Claims. (Cl. 88—1)

This invention relates to an improved mounting for optical elements with contacting surfaces requiring the incorporation of an extremely thin film of a material of suitable refractive index in order to fill out the microscopic unevennesses of the contacting faces and assure the production of a true optical path therethrough. More particularly the invention relates to mounting methods in optics for ultraviolet equipment using ammonium dihydrogen phosphate as a birefringent material.

Multiple element optical equipment for use in the visible spectrum presents in many cases no serious problem where the elements have one or more faces contacting. It is conventional to cement such elements together with a thin film of a hardening cement, which cements the elements together into a unit having considerable mechanical strength. The ordinary materials used in optics in the visible spectrum, such as glass, are strong, hard and relatively noncorroding, and the hardening cements have adequate light transmission in the visible spectrum. In the ultraviolet region, however, a very different situation is presented. Here there are no readily available hardening cements which are at the same time relatively transparent to short wave ultraviolet light, do not selectively absorb light in the ultraviolet, and in the case of certain particular optical materials such as ammonium dihydrogen phosphate, do not corrode this easily corroded material.

There are many permanent liquids known, such as refined mineral oil and the like, which have excellent transparency in the ultraviolet, and which do not corrode moisture-sensitive optical material, such as ammonium dihydrogen phosphate. These liquids when present as a microscopically thin film fill out the microscopic unevennesses of contacting faces of optical elements and are capable of producing true optical contact between the faces. However, these liquids have not been practical hitherto because they impart no mechanical strength to the multi-element optics which can either not be produced at all or are too fragile for practical use in equipment of ordinary design. An especially serious instance of the above problem is presented by polarized-light, flickering-beam spectrophotometers, which have achieved such tremendous success and widespread use in the visible and near infrared spectra. These devices require optics having one or more pairs of contacting surfaces, such as Rochon prisms, Wollaston prisms and their contacting lens elements. The problem is rendered even more serious in the instruments using Rochon prism flickering beams because the multicomponent optics are rotated at high speed and are therefore subjected to rather severe mechanical stresses.

The problem presented by the polarized-light, flickering-beam spectrophotometer is made even more acute when the spectrophotometer uses optics of ammonium dihydrogen phosphate, as is described and claimed in the patent of Gabel and Buc, No. 2,540,780, issued February 6, 1951. In that patent there is not only the problem of providing a true optical contact between the faces of the elements in the optics with adequate mechanical strength but also the additional problem of protecting the water-soluble optics against moisture. This latter involves the use of base plates or lenses of quartz which present additional interfaces with the elements.

Where a true optical contact must be produced, the present invention solves the problems presented in multiple-element optics with one or more pairs of faces in contact by means of permanent liquids, and particularly with permanent liquids having suitable transparency. More particularly this solution is just as useful in the ultraviolet as in the visible spectrum. Essentially the solution lies in mounting the multiple-element optics in a surrounding sleeve or casing preventing radial movement, and compressing the optics axially by spring pressure between retaining flanges or projections on the casing or attached thereto. The interfaces of multiple-element optics are treated to produce a true optical path through the interface by the interposition of a microscopically thin film of any inert liquid of suitable transparency and refractive index. The thin film of liquid, which is only thick enough to fill up unevennesses in the polished faces of the optics, has substantially no mechanical holding power and does not act as a cement to unite the elements of the optics into a mechanically strong unit.

In many instruments, particularly, polarized-light spectrophotometers, where rotation of the optical elements is frequently necessary these elements will be round and, accordingly, the casing will be circular. However, it is obvious that the shape of the optical elements has nothing to do with the invention, and they may be square, rectangular, or any suitable shape other than round. The term "radial" is therefore used in a generalized sense as designating direction normal to the optical axis of the element and is not intended to limit the invention to elements of circular cross section.

The liquids used in the present invention impart but little, if any, mechanical strength to the optical elements and exert their optical function of filling up discontinuities in the optical surfaces and preventing reflection at the interfaces without performing any cementing function.

While the invention in its broader applications includes optics made of hard, moisture-resistant material, such as quartz, in a more specific and preferred embodiment, it is directed to the mountings of optics having contacting faces which are formed of material that is readily clouded or disintegrated by moisture, such as ammonium dihydrogen phosphate. In such cases, end plates, which may be optical flats, planoconvex lenses, etc., receive the spring pressure and distribute it over the faces of the moisture-sensitive optical elements. This preferred embodiment has the additional advantage that the moisture-sensitive material bears on large surfaces and does not, therefore, have to be either hard or mechanically strong, even though the joined elements prepared may be subjected to very considerable mechanical stresses as, for example, in a flicker motor or a polarized-light, flickering-beam spectrophotometer.

The chemical nature of the liquid is not of significance except, of course, that it must be inert to the materials of which the optical elements are made. The liquid must, however, possess the required optical characteristics such as adequate transmission in the case of ultraviolet equipment, suitable refractive index, freedom from fluorescence, and the like. Highly purified mineral oil of the medicinal oil type which is composed of substantially pure paraffin hydrocarbons, constitutes one of the best and most satisfactory cementing liquids. It is inert, has adequate ultraviolet transmission, and is stable as well as colorless. However, other inert liquids may be used in place of the preferred hydrocarbon liquid. Typical examples of such other liquids are: alcohols, ethers, hydrocarbons that are free of conjugate systems, cyclohexane, 1-dodecanol and homologues, bis-pentachlor ethyl ether (solid), carbon tetrachloride, and other fluorine and chlorine substituted saturated hydrocarbons.

The mounting sleeve, or casing, may be not only of any suitable cross section, but also of any material having satisfactory strength. For most purposes metals are preferred, although the invention is not limited thereto. The main purpose of the casing is to hold the elements radially, and, preferably, to provide an anchoring base for the application of spring pressure to the ends of the elements. Where round casings are suitable, a slotted casing with tapered threads at one end presents many practical advantages. A suitably threaded cap may serve both to compress the casing radially against the optical elements and also to provide the necessary degree of spring pressure on the ends. Such a design is preferred although, of course, any other suitable mechanical shape may be employed.

The invention will be described in greater detail in conjunction with a typical cemented prism mounting for use in a polarized-light, flickering-beam spectrophotometer, and will be illustrated in the drawings in which:

Figure 1 is a cross section through the element; and

Figure 2 is a perspective of the slotted sleeve or casing.

In the mounting described in the drawings, two prismatic elements 1 and 2 of ammonium dihydrogen phosphate are held between a quartz end plate 3 and a quartz lens 4, the prisms being joined along the line 5, which represents a microscopically thin film of an ultraviolet transmitting, inert liquid prepared from purified mineral oil. The elements are all mounted in a sleeve 6, provided at one end with a projecting flange 12 engaging the periphery of the lens 4. The sleeve (Fig. 2) is provided with an outer flanged portion 11 with three sleeve portions separated by slots and provided at their opposite end with tapered threads 10. After mounting the optical elements in the sleeve, a threaded cap 7 and a spring 8 are screwed onto the threaded portion of the sleeve, compressing the spring against the end plate 3 and forcing out thereby any excess liquid along the line 5 so that the remaining liquid line is only thick enough to make true optical contact between the faces of the elements and does not permit liquid to run out. The whole sleeve is then snugly mounted in an outer sleeve 9, which protects the ammonium dihydrogen phosphate prisms 1 and 2 from access to moisture through the slots. The whole may be mounted in any suitable apparatus, such as a photometer bushing, or the like.

In Figure 1 the apparatus illustrated diagrammatically at 13 is a synchronous flicker motor.

The alignment of the elements and the microscopic line of liquid at their interfaces are maintained regardless of considerable mechanical stresses, the stability being in no wise inferior and in many cases superior to ordinary cemented optical elements as used in instruments operating in the visual region. It should be noted that the problem solved by the present invention requires radial support and is not to be confused with the ordinary spring mounting of solid lenses as, for example, condenser lenses in photographic enlargers. The spring mounting assures a constant and uniform pressure on the interfaces, maintaining constant optical homogeneity. The spring will also adjust itself to temperature changes, but this is not a significant feature in the present invention, which does not present the problem of great temperature changes as in projector lenses for motion pictures or other projectors where great temperature differences are sometimes compensated for by soft or resilient mountings. It is essential that there be the same degree of radial as well as axial support.

The microscopically thin film of liquid in the interfaces between the optical element should not be confused with large bodies of suitable liquids which have been used in containers as liquid lenses, prisms and other optical elements. Such large bodies of liquids when used between elements which are to have interfaces in accordance with the present invention are incapable of practical use as the liquid in great thicknesses will not maintain itself in an interface formed of abutting flat surfaces of optical elements. If the thickness of the liquid film exceeds microscopical dimensions, the liquid will run out, particularly in multi-component elements subjected to centrifugal force as in rapidly rotated flicker prisms and the like. The liquid in the interface of the elements according to the present invention performs an entirely different function. It itself is not an optical element as in the case of a liquid lens or prism; in fact, it must be so thin and so uniform that it does not exert any optical effect of its own. Its purpose is to provide true optical contact between the elements at the interface. No liquid would be needed at an interface if perfect optical surfaces could be produced. The sole function of the microscopically thin film of liquid is to fill up discontinuities unavoidably present in even the most perfect optical surfaces which is substantially the same as if there were perfect element-to-element contact. When the film becomes thick enough to behave itself as an optical element, as in the case of a liquid lens or prism, it ceases to perform the function of the liquid in the present invention and renders multi-component elements practically useless for the purpose for which they are used in the present invention. This application is in part a continuation of my co-pending application, Serial No. 172,688, filed July 8, 1950, now abandoned.

I claim:

1. A multi-component optical assembly comprising in combination a mounting case having bearing surface means at one end, a light-transmitting multi-component optical element mounted in said case, the element being composed of a plurality of individual elements having at least one interface between element surfaces at an angle to the axis of the multi-component element less than a right angle and sufficiently axially unsymmetrical so that axial pressure results in a radial pressure component on the individual elements, means for radially confining the elements in the case, the interface being a microscopically thin film of an inert liquid which remains permanently liquid and is only thick enough to produce true optical contact across the interface, said liquid being light-transmitting and contributing negligble mechanical strength to the elements joined at the interfaces, and spring pressed retaining elements connected to the casing at the end opposite the bearing surface means and positioned to exert axial pressure on the multi-component optical element whereby axial contact of the elements and the microscopic film of liquid is maintained regardless of expansion and contraction of the case.

2. An element according to claim 1 including a plurality of optical elements of ammonium dihydrogen phosphate having surfaces contacting the interface at an angle to the axis of the multi-component element which is a liquid which remains permanently liquid, the liquid comprising the interface being characterized by low absorption in the ultraviolet.

3. An element according to claim 2 provided with end elements substantially unaffected by moisture.

4. A multi-component optical assembly comprising in combination a mounting case having bearing surface means at one end thereof a transparent multi-component optical element comprising a plurality of ammonium dihydrogen phosphate elements which have surfaces contacting at least one interface at an angle to the axis of said multi-component element, which angle is less than the right angle and sufficiently axially unsymmetrical so that the axial pressure results in a radial pressure component on the elements, each interface being a microscopically thin film of an inert liquid which remains permanently liquid and is only thick enough to produce true optical contact across the interface and has low absorption in the ultraviolet and contributes negligible mechanical strength to the elements joined at the interfaces, said mounting case being slotted longitudinally and provided with a tapered threaded end opposite to the end having bearing surface means, a threaded element engaging said threads and capable of compressing the slotted portions of the casing on tightening, said threaded element being provided with bearing points and a spring engaging said bearing points and bearing on one end of the multi-component optical element, whereby axial contact of the elements on the microscopic liquid film is maintained regardless of expansion and contraction of the case.

5. An assembly according to claim 4 in which the ammonium dihydrogen phosphate elements are provided with transparent end elements substantially unaffected by moisture.

JOSEPH W. GABEL.

References Cited in the file of this patent

UNITED STATES PATENTS

| Number | Name | Date |
| --- | --- | --- |
| 983,047 | Grant | Jan. 31, 1911 |
| 994,935 | Kleinschmidt | June 13, 1911 |
| 1,267,014 | Tillyer | May 21, 1918 |
| 2,229,454 | Holmes | Jan. 21, 1941 |
| 2,437,126 | Reardon et al. | Mar. 2, 1948 |
| 2,493,200 | Land | Jan. 3, 1950 |
| 2,550,962 | Brandon | May 1, 1951 |

OTHER REFERENCES

Wood: "Physical Optics," 1936, 3rd addition, page 338. Published by The Macmillan Co., New York. (Copy in Division 7.)